(12) United States Patent
Roberts

(10) Patent No.: US 7,921,697 B2
(45) Date of Patent: Apr. 12, 2011

(54) METHOD AND APPARATUS FOR MONITORING AN UNDERDRAIN OF A FILTER SYSTEM

(75) Inventor: R. Lee Roberts, Chadds Ford, PA (US)

(73) Assignee: RG Delaware, Inc., Wilmington, DE (US)

( * ) Notice: Subject to any disclaimer, the term of this patent is extended or adjusted under 35 U.S.C. 154(b) by 0 days.

(21) Appl. No.: 12/801,313

(22) Filed: Jun. 3, 2010

(65) Prior Publication Data
US 2010/0282651 A1 Nov. 11, 2010

Related U.S. Application Data

(62) Division of application No. 11/340,642, filed on Jan. 27, 2006, now Pat. No. 7,754,089.

(51) Int. Cl.
*B01D 17/12* (2006.01)
*B01D 24/46* (2006.01)
(52) U.S. Cl. ........................ 73/61.69; 210/741
(58) Field of Classification Search ............ 210/741, 210/90, 96.1, 739, 745, 108, 793, 275; 73/756, 73/864, 61.69, 717
See application file for complete search history.

(56) References Cited

U.S. PATENT DOCUMENTS

| | | | |
|---|---|---|---|
| 4,187,175 A | 2/1980 | Roberts et al. | |
| 4,619,765 A | 10/1986 | Roberts | |
| 5,080,808 A | 1/1992 | Kim et al. | |
| 5,198,124 A | 3/1993 | Kim et al. | |
| 5,314,630 A | 5/1994 | Kim et al. | |
| 5,980,755 A * | 11/1999 | Roberts et al. | 210/741 |
| 6,159,384 A | 12/2000 | Roberts et al. | |
| 6,569,327 B2 | 5/2003 | Roberts et al. | |
| 6,740,237 B1 | 5/2004 | Roberts et al. | |
| 6,982,034 B2 | 1/2006 | Roberts et al. | |
| 6,989,096 B2 | 1/2006 | Roberts et al. | |
| 2005/0109706 A1 | 5/2005 | Hambley et al. | |

OTHER PUBLICATIONS

U.S. Appl. No. 11/340,642, filed Jan. 27, 2006 and pending in GAU 1797.

* cited by examiner

*Primary Examiner* — Walter D Griffin
*Assistant Examiner* — Cameron J Allen
(74) *Attorney, Agent, or Firm* — Merek, Blackmon & Voorhees, LLC

(57) ABSTRACT

A method and apparatus for monitoring an underdrain in a filter system for filtering water or wastewater. At least one diagnostic condition relating to the performance of the underdrain is monitored to determine if the underdrain is operating in an acceptable manner.

20 Claims, 5 Drawing Sheets

METHOD AND APPARATUS FOR MONITORING AN UNDERDRAIN OF A FILTER SYSTEM

RELATED APPLICATIONS

The subject patent application is a divisional of U.S. patent application Ser. No. 11/340,642 filed on Jan. 27, 2006 now U.S. Pat. No. 7,754,089, the entire contents of which is incorporated herein by reference.

FIELD OF THE INVENTION

The present invention is directed to water and/or wastewater filter systems for filtering impurities from a liquid. More particularly, the present invention is directed to a method and apparatus for monitoring an underdrain system of a water and/or wastewater filter system.

BACKGROUND OF THE INVENTION

Various filter systems have been developed to filter water and wastewater. Typical filter systems include but are not limited to an upflow filter, a downflow filter, a combined upflow filter and a downflow filter and multiple downflow filters connected in series. The term upflow filter is given to a filter in which the liquid or influent to be filtered is directed in an upward path to remove impurities. Conversely, a downflow filter is a filter in which the influent is directed in a downward path to remove impurities. In a combined upflow/downflow filter system, influent is initially directed upwardly through the upflow filter to remove a predetermined percentage of the impurities in the influent and then directed downwardly through the downflow filter to remove the remaining impurities to within an acceptable limit. Where the filter system includes multiple downflow filters connected in series, the influent is directed downwardly through each of the downflow filters one after the other to remove the impurities to within an acceptable limit.

Regardless of the type of filter system and/or the type of the liquid to be filtered, it is common for the filter system to include an underdrain. The underdrain directs and/or receives fluids during operation of various cycles of the filter system including the filtration cycle and the washing cycle. The fluids may include influent, pre-filtered washing water, effluent and air. A key function of the underdrain is to evenly distribute the washing fluid through the filter bed during a washing cycle so that at least a significant amount of the impurities trapped in the filter bed can be removed. In the event that the underdrain does not evenly distribute the washing fluid through the filter bed, the filter bed most likely will not be properly cleaned. At a minimum this will cause much shorter filtration cycles and more washing cycles. This is undesirable, as the filter system typically cannot operate in the filtration cycle during a washing cycle. Accordingly, the amount of filtered water produced by a filter system for a given period of time can be significantly reduced.

One type of underdrain system that is used in a filter is one or more porous plates anchored to one or more underdrain blocks. The porous plate is typically located adjacent the filter bed. The porous plate was developed at least in part to obviate the need for one or more gravel support layers between the filter media and the underdrain. The gravel support layers have been used to prevent the filter media from becoming lodged in the underdrain. However, the gravel support layers have several disadvantages including the fact that the gravel layers take up space in the filter that could be occupied by filter media. As such, gravel support layers inherently limit the amount of impurities that can be removed from a fluid during any given filtration cycle. However, underdrain systems using porous plates are not without problems. For example, the fine filter media can become lodged in various pores of the porous plate thereby preventing the washing fluid from passing through that portion of the porous plate. Accordingly, the washing fluid is not directed evenly through the filter bed inherently leading to shorter filtration cycles. This clogging problem can become so extensive over the porous plate that the pressure of the fluid immediately upstream of the porous plate becomes dangerously high causing the porous plate to lift off the underdrain necessitating the filter system to be shutdown for days or even months in extreme cases while this underdrain failure is corrected.

Other problems are present in underdrains apart from the clogging problem described above. For example, underdrains are designed to operate within estimated hydraulic and/or structural capacities. Filter systems can be inadvertently operated at high flow rates where the pressure exerted on the underdrain by the fluid passing upwardly there through exceeds design capacity. This could lead to the underdrain lifting or otherwise failing.

A preferred form of the present invention provides a method and apparatus for monitoring an underdrain of a filter system for filtering water or wastewater during operation of the filter that overcomes the disadvantages described above.

OBJECTS AND SUMMARY OF THE INVENTION

An object of the present invention is to provide a novel and unobvious method and apparatus for monitoring an underdrain of a filter system during operation of the filter system.

Another object of a preferred embodiment of the present invention is to provide a method and apparatus for monitoring an underdrain of a filter system during operation of the filter system that overcomes at least one of the disadvantages of the prior art.

A further object of a preferred embodiment of the present invention is to eliminate or significantly reduce underdrain failures.

Yet another object of a preferred embodiment of the present invention is to provide a method and apparatus that allows the underdrain of a filter system to be readily monitored during operation of the filter system without interrupting the normal operation of the filter system.

Still another object of a preferred embodiment of the present invention is to provide a method and apparatus for monitoring an underdrain in a filter system that permits data to be logged and used to determine when high pressure or high flow events occur during operation of a filter system thereby allowing the root cause of the potentially damaging event to be identified.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a method of monitoring an underdrain of a filter system for filtering a liquid. The filter system includes a filter bed and an underdrain operably associated with the filter bed for directing a fluid through the filter bed. The filter system further includes a sensor for sensing at least one diagnostic condition relating to performance of the underdrain. The method comprises the steps of: (a) obtaining at least one reading from the sensor relating to performance of the underdrain; and, (b) determining whether the underdrain is performing at a predetermined acceptable level based at least in part on the reading obtained from the sensor in step (a).

Another embodiment of the present invention is directed to a method of monitoring an underdrain of a filter system for filtering a liquid. The filter system includes a filter bed and an underdrain operably associated with the filter bed for directing a fluid through the filter bed. The filter system further includes a sensor for sensing at least one diagnostic condition relating to flow of fluid through the underdrain. The method comprises the steps of: (a) obtaining at least one reading from the sensor relating to flow of fluid through the underdrain; and, (b) determining whether the underdrain is performing at a predetermined acceptable level based at least in part on the reading obtained from the sensor in step (a).

A further embodiment of the present invention is directed to a filter system for filtering a liquid including a filter bed having at least one layer of filter media for removing impurities from a liquid passing through the filter bed and an underdrain operably associated with the filter bed for directing a fluid through the filter bed during a washing cycle to remove impurities retained in the filter bed during a filtration cycle. The system further includes a first sensor for sensing at least one diagnostic condition relating to flow of the fluid through the underdrain and a controller for evaluating the at least one reading of the first sensor to determine whether the flow of fluid through the underdrain is within a predetermined acceptable level.

Still another embodiment of the present invention is directed to a filter system for filtering a liquid including a filter bed having at least one layer of filter media for removing impurities from a liquid passing through the filter bed and an underdrain operably associated with the filter bed for directing a washing fluid through the filter bed during a washing cycle to remove impurities retained in the filter bed during a filtration cycle. The filter system further includes a monitoring means for monitoring the underdrain to determine whether the underdrain is performing at a predetermined acceptable level.

Yet still another embodiment of the present invention is directed to a filter system for filtering a liquid including a filter bed having at least one layer of filter media for removing impurities from a liquid passing through the filter bed and an underdrain operably associated with the filter bed for directing a fluid through the filter bed. The filter system further includes a pressure gauge for measuring pressure of the fluid. The pressure gauge is disposed upstream of a top surface of the underdrain relative to a direction of flow of a washing fluid.

Yet a further embodiment of the present invention is directed to a method of monitoring an underdrain of a filter system for filtering a liquid. The filter system includes a filter bed and an underdrain operably associated with the filter bed for directing a fluid through the filter bed. The filter system further includes a sensing unit for sensing differential pressure across the underdrain. The method comprising the steps of: (a) at any point in time after the filter system has been filtering a liquid, obtaining a differential pressure across the underdrain to determine whether the underdrain is performing at a predetermined acceptable level.

Yet still a further embodiment of the present invention is directed to a filter system for filtering a liquid including a filter bed having at least one layer of filter media for retaining impurities in a liquid to be filtered and an underdrain operably associated with the filter bed for directing a fluid through the filter bed. The filter system further includes a monitoring unit for monitoring differential pressure across two vertically spaced points of the underdrain to determine whether the underdrain is performing acceptably.

DETAILED DESCRIPTION OF THE PREFERRED EMBODIMENTS OF THE INVENTION

The preferred forms of the invention will now be described with reference to FIGS. 1-5. The appended claims are not limited to the preferred forms and no term and/or phrase used herein is to be given a meaning other than its ordinary meaning unless it is expressly stated that the term and/or phrase shall have a special meaning.

FIG. 1

Figure 1:
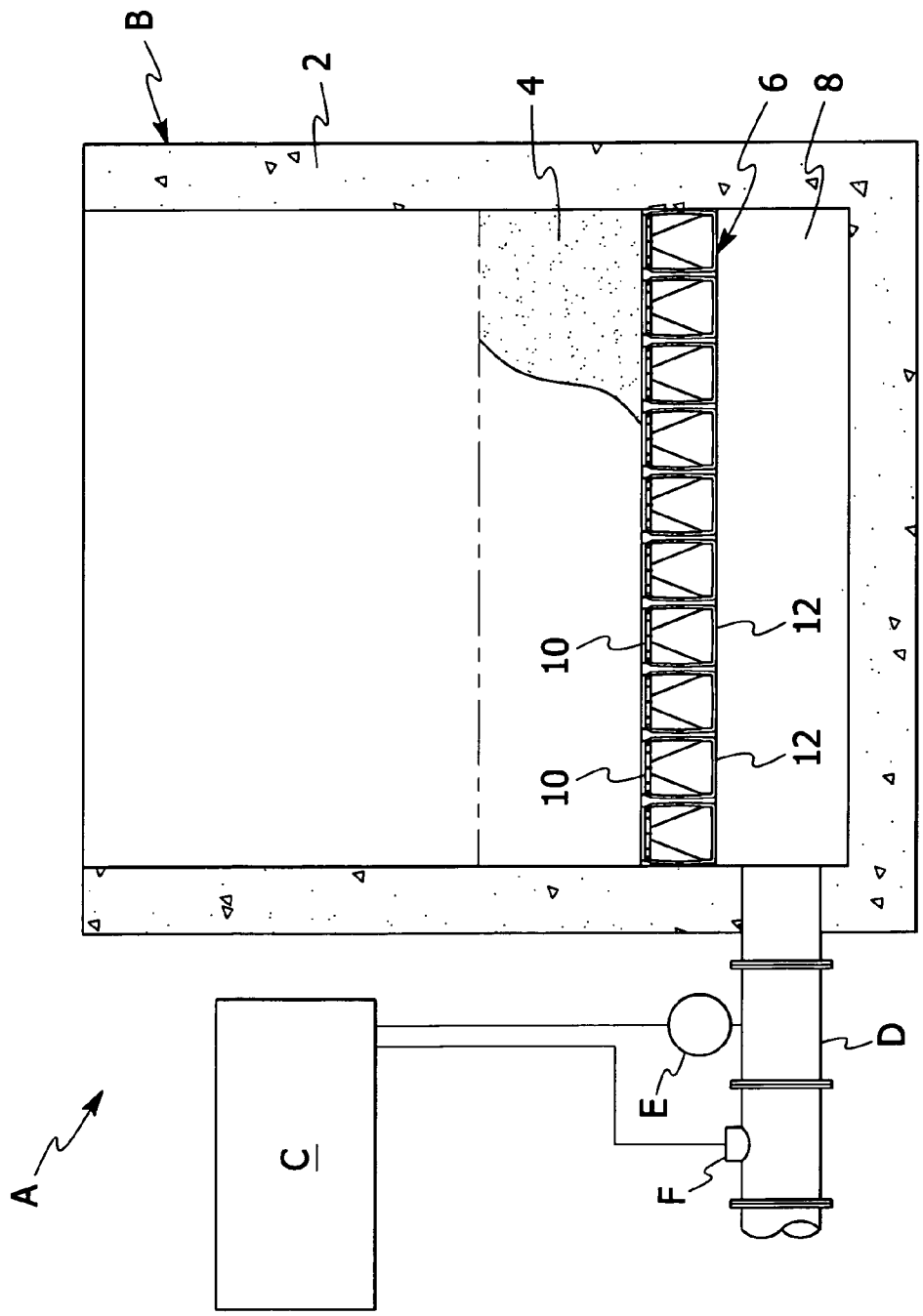
FIG. 1 is an elevation view of a filter system formed in accordance with a first preferred embodiment of the present invention with portions thereof omitted to better illustrate the inner workings of the filter system.

Referring to FIG. 1, a portion of a filter system A is illustrated in one of many possible configurations. The filter system A includes a filter B, a controller/monitor C, a supply line D, a pressure sensor E and a flow meter F. The filter B includes a filter housing 2, a filter bed 4, an underdrain 6, and a flume 8. An inlet conduit (not shown) is disposed above the filter housing 2 to direct influent (i.e., unfiltered liquid) to the filter bed 4 such that the influent flows downwardly by gravity through the filter bed 4. Impurities in the liquid being filtered are retained by the filter bed 4. It will be readily appreciated that filter B is not limited to a single downflow filter but rather could be any type of filter including but not limited to an upflow filter, a bi-flow filter or a modular filter or any combination thereof. The filter bed 4 is depicted as having only a single layer of filter media supported by underdrain 6. However, it will be readily appreciated that the filter bed 4 could include two or more layers of filter media. Further, it will be readily appreciated that one or more gravel support layers could support the filter media above the underdrain 6.

The underdrain 6 includes a porous plate 10 anchored to the top of and extending along the longitudinal axis (i.e., the axis extending into the page as seen in FIG. 1) of each of the underdrain blocks 12. While the underdrain 6 is shown as including a plurality of underdrain blocks and porous plates, it will be readily appreciated that the present invention could be used to monitor any underdrain including media retaining screens, with or without porous plates and/or support gravel.

Examples of some of the many underdrains that can be monitored by the present invention are disclosed in U.S. Pat. Nos. 6,989,096; 6,569,327; 6,982,034; 6,740,237; and 4,619,765. Flume 8 is a chamber below underdrain 6 that receives fluid from or directs fluids to underdrain 6. Specifically, during a filtration cycle, the effluent, i.e., the liquid after passing through the filter bed 4, collects in the flume 8 and is carried away to a predetermined location via supply line D. During a washing cycle, the washing liquid is introduced into flume 8 by supply line D. The washing liquid passes through the underdrain 6 which if working properly should evenly distribute the washing liquid throughout the filter bed 4 to ensure proper cleaning. The washing liquid could be either filtered water or unfiltered water. Further, air could be used by itself or in combination with a liquid to clean the filter bed 4. It will be readily appreciated that flume 8 cam be of any configuration or may be omitted in its entirety.

A pressure sensor E is operably connected to supply line D to measure the pressure of the washing fluid for reasons that will be explained in more detail below. Flow meter F measures the flow rate of the fluid through supply line D. The flow meter F and pressure sensor E are connected to a controller/monitor C. It can be readily determined if the underdrain 6 is clogged or otherwise obstructed from the readings obtained by the pressure sensor E and the flow meter F. Specifically, when the pressure of the washing fluid is measured by sensor E and the flow rate of the fluid is measured by flow meter F these values can be compared to predetermined acceptable values to determine if the underdrain 6 is obstructed. For example, if the pressure measured is 2X at a measured flow rate of Y for a fluid Z and the predetermined acceptable values are X for pressure of fluid Z at a flow rate of Y, this would indicate that the underdrain 6 is clogged or somehow obstructed as the measured value is twice the accepted value. Preferably, the readings from sensor E and flow meter F are taken shortly after the filter bed 4 has been cleaned so that the increase in pressure can be attributed to the underdrain 6 and not a substantial increase in the impurities trapped in filter bed 4 during a filtration cycle. Preferably, the readings are taken an hour or less after the filter bed 4 has been washed. The pressure reading from pressure sensor E can be used without regard to the flow rate to determine if the underdrain 6 may need servicing. For example, the pressure reading obtained by pressure gauge E can be compared to a predetermined pressure value corresponding to the structural capacity or hydraulic capacity of underdrain 6. If the measured pressure reading is exceeding or reaching the predetermined value, this would signal to an operator that a significant problem may exist. While pressure has been monitored to determine if underdrain 6 is performing in an acceptable manner, any diagnostic condition may be monitored that relates to the performance of underdrain 6. It is further noted that the location of pressure sensor E can vary. For example, the pressure sensor E could be located in flume 8. Further, the pressure readings may be logged and used to determine when high pressure or high flow events occur during operation of a filter system thereby allowing the root cause of the potentially damaging event to be identified.

The controller C is operably connected to pressure sensor E and flow meter F. The controller C could be very simple and merely display the readings from pressure sensor E and flow meter F. Further, controller C could include a complex control processing unit that processes the readings from pressure sensor E and flow meter F including comparing the measured readings to stored values to determine if the underdrain 6 is operating properly. The controller C could also include an audible and/or visible alarm to indicate when the underdrain 6 is not operating within a predetermined acceptable level.

FIG. 2

Figure 2:
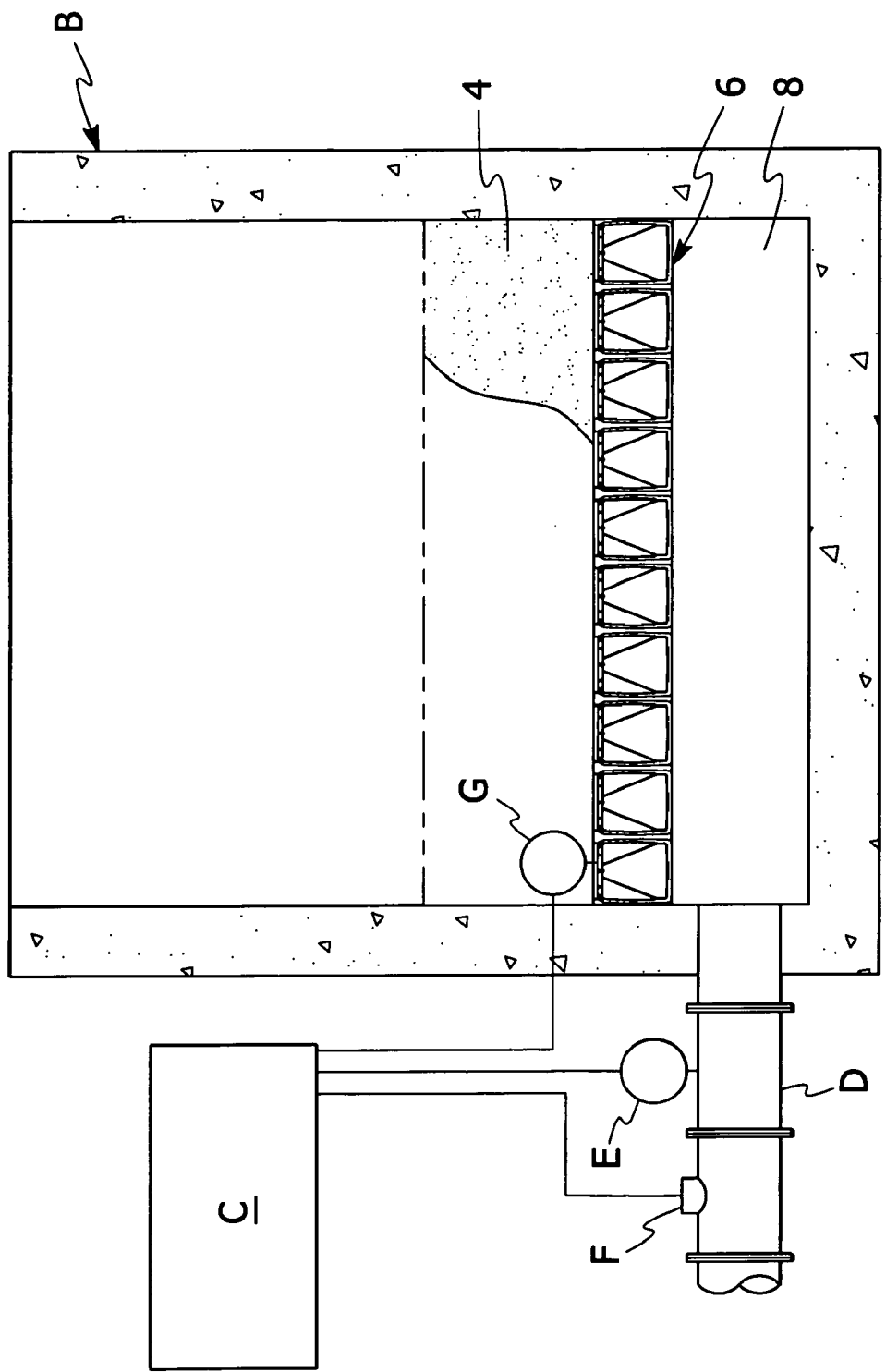
FIG. 2 is an elevation view of a filter system formed in accordance with a second preferred embodiment of the present invention with portions thereof omitted to better illustrate the inner workings of the filter system.

Referring to FIG. 2, an alternative preferred embodiment is shown. This embodiment is very similar to the preferred embodiment depicted in FIG. 1 and, therefore, only the differences will be described in detail. It should be noted that the same elements are given the same reference numerals. This embodiment differs from the embodiment of FIG. 1 in that an additional sensor G is mounted on the underdrain 6. Most preferably, sensor G is a pressure gauge for gauging pressure immediately downstream of underdrain 6. Sensor G is connected to controller C. By obtaining pressure readings from pressure gauges E and G and flow rate from flow meter F, a differential pressure across underdrain 6 can be determined at a given fluid flow rate. This pressure differential can then be compared against a predetermined pressure differential at the same flow rate to determine if underdrain 6 is operating acceptably. Further, the differential pressure can be used without regard to flow rate to determine if the underdrain needs to be serviced in a manner similar to that described in connection with the filter system depicted in FIG. 1. It should be noted that in is this embodiment the second pressure gauge G permits the monitoring system to isolate the underdrain 6, i.e., the differential pressure obtained from the readings of gauges E and G is not affected by other components of the filter system, e.g., the filter bed 4. While this preferred embodiment illustrates monitoring an upward flow of fluid, measuring differential pressure can be bi-directional, e.g. the differential pressure can be measured during a downward flow of fluid such as occurs in a filtration cycle of a downflow filter.

FIG. 3

Figure 3:
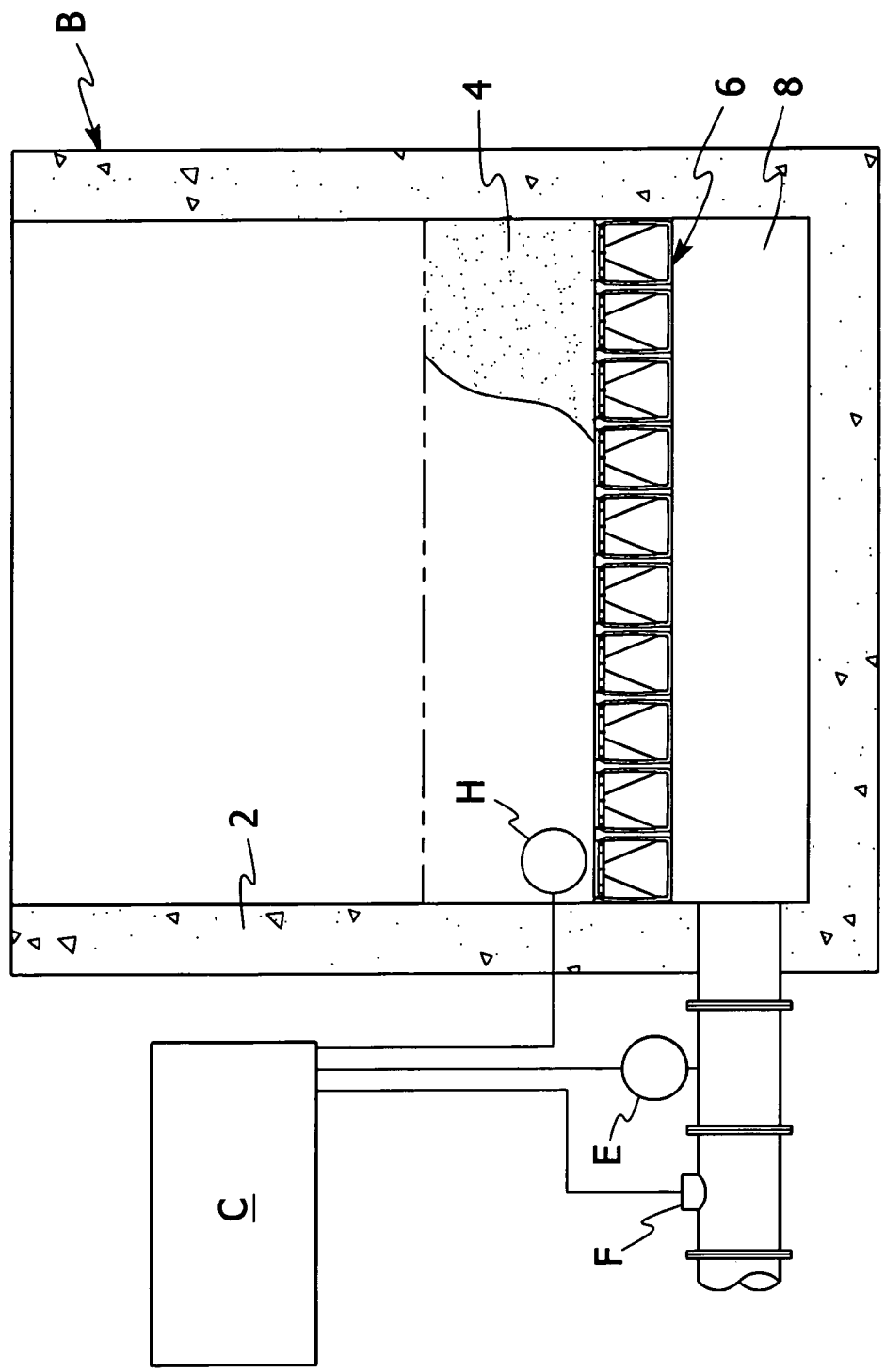
FIG. 3 is an elevation view of a filter system formed in accordance with a third preferred embodiment of the present invention with portions thereof omitted to better illustrate the inner workings of the filter system.

A third preferred embodiment is depicted in FIG. 3. This embodiment is similar to the embodiment depicted in FIG. 2 and, therefore, only the differences will be described in detail. It should be noted that the same elements are given the same reference numerals. This embodiment differs from the embodiment depicted in FIG. 2 in that the second pressure sensor H is mounted to the filter housing 2 as opposed to the underdrain 6.

FIG. 4

Figure 4:
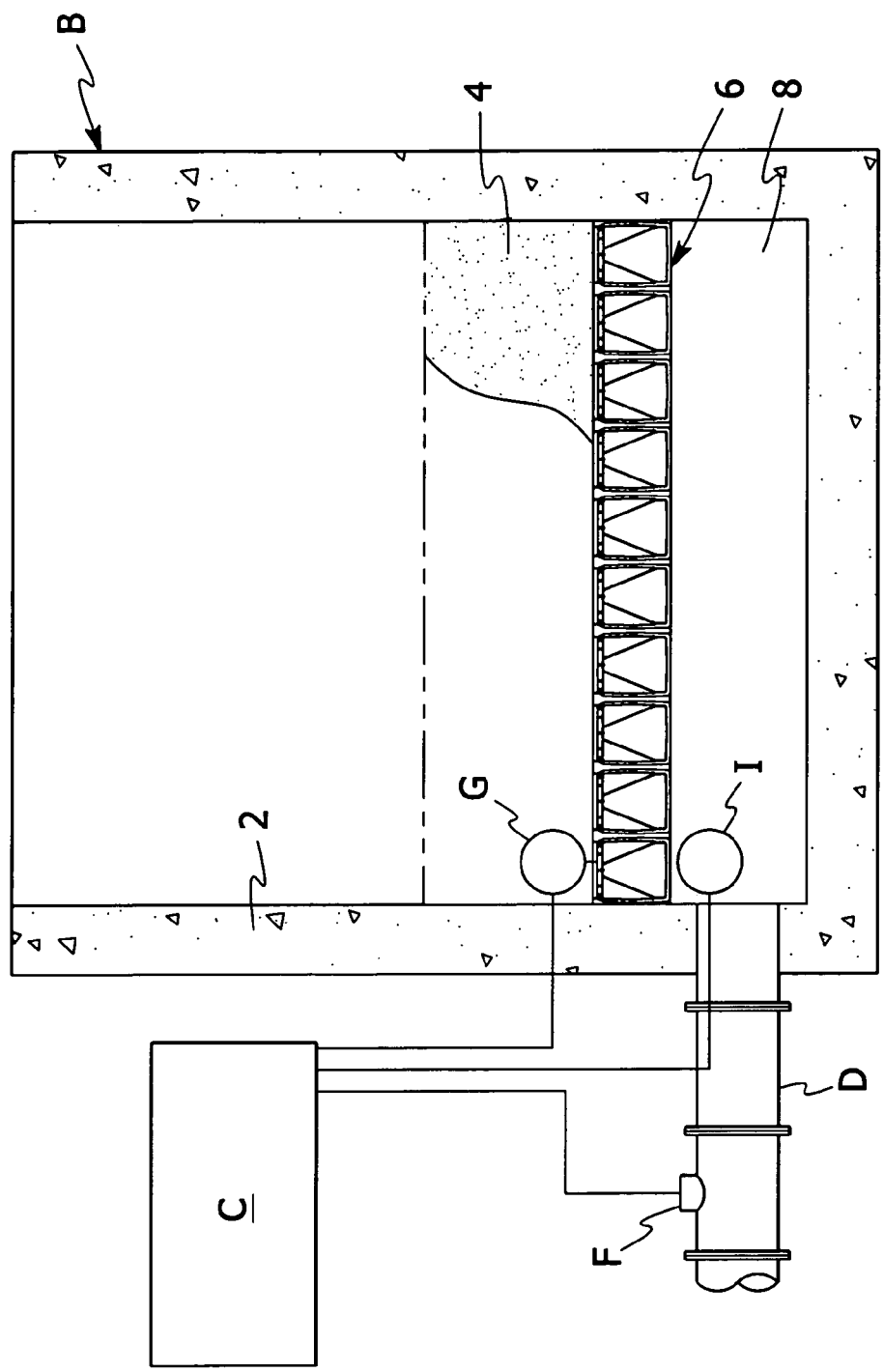
FIG. 4 is an elevation view of a filter system formed in accordance with a fourth preferred embodiment of the present invention with portions thereof omitted to better illustrate the inner workings of the filter system.

A fourth preferred embodiment is depicted in FIG. 4. This embodiment is similar to the embodiment depicted in FIG. 2 and, therefore, only the differences will be described in detail. It should be noted that the same elements are given the same reference numerals. This embodiment differs from the embodiment depicted in FIG. 2 in that the first pressure sensor I is located in flume 8.

FIG. 5

Figure 5:
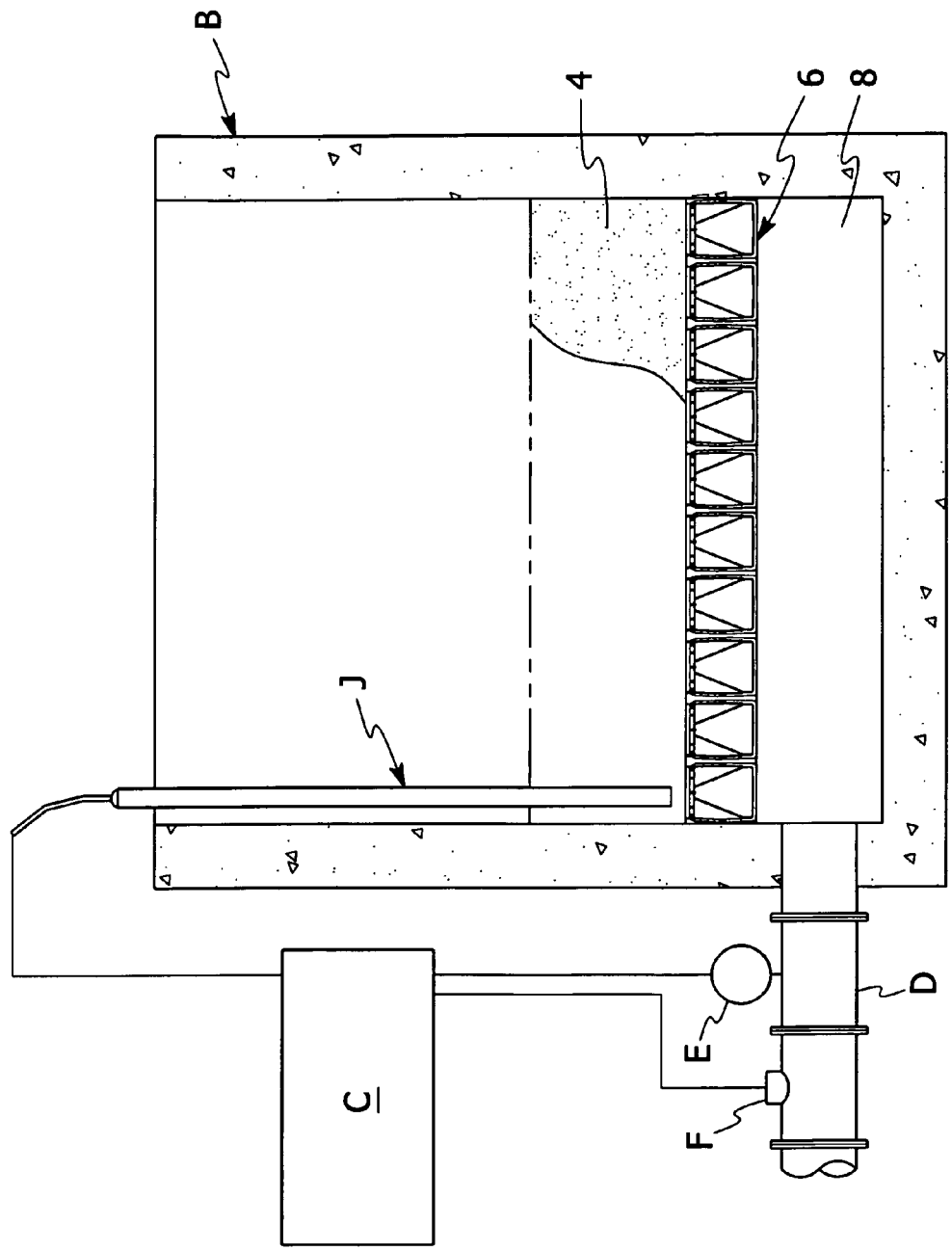
FIG. 5 is an elevation view of a filter system formed in accordance with a fifth preferred embodiment of the present invention with portions thereof omitted to better illustrate the inner workings of the filter system.

A fifth preferred embodiment is depicted in FIG. 5. This embodiment is similar to the embodiment depicted in FIG. 2 and, therefore, only the differences will be described in detail. It should be noted that the same elements are given the same reference numerals. This embodiment differs from the embodiment depicted in FIG. 2 in that a second pressure sensor J is an elongated tube with a pressure sensing element positioned on the bottom of the tube adjacent underdrain 6. This pressure sensor can be inserted after the filter system has been assembled and operated. Specifically, the sensor J can be readily inserted in the filter B when the filter bed 4 is fluidized.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A filter system for filtering a liquid, comprising:
   (a) a filter bed having at least one layer of filter media for removing impurities from a liquid passing through said filter bed;
   (b) an underdrain operably associated with said filter bed for directing a fluid through said filter bed during a washing cycle to remove impurities retained in said filter bed during a filtration cycle;
   (c) a first sensor for sensing at least one diagnostic condition relating to flow of the fluid through said underdrain; and,
   (d) a controller for evaluating the at least one reading of said first sensor to determine whether the flow of fluid through said underdrain is within a predetermined acceptable level.

2. A filter system as recited in claim 1, further including:
   (a) an inlet conduit for directing influent downwardly through said filter bed during filtration.

3. A filter system as recited in claim 1, further including:
   (a) a washing pipe line for directing a washing liquid to said underdrain, said first sensor is a pressure sensor disposed in said washing pipe line upstream of said underdrain relative to a direction of flow of the washing liquid.

4. A filter system as recited in claim 3, further including:
   (a) a second sensor disposed downstream of said underdrain relative to direction of flow of the washing fluid.

5. A filter system as recited in claim 3, wherein:
   (a) said second sensor is disposed below a top surface of said filter bed and above bottom surface of said underdrain.

6. A filter system as recited in 4, further including:
   (a) a controller for evaluating at least one reading of said first sensor and at least one reading of said second sensor to determine whether the flow of fluid through said underdrain is being obstructed.

7. A filter system for filtering a liquid, comprising:
   (a) a filter bed having at least one layer of filter media for removing impurities from a liquid passing through said filter bed;
   (b) an underdrain operably associated with said filter bed for directing a washing fluid through said filter bed during a washing cycle to remove impurities retained in said filter bed during a filtration cycle; and,
   (c) a monitoring means for monitoring said underdrain to determine whether said underdrain is performing at a predetermined acceptable level.

8. A filter system as recited in 7, wherein:
   (a) said monitoring means includes a pressure gauge for measuring pressure of a washing fluid, said pressure gauge being disposed upstream of a top surface of said underdrain relative to a direction of flow of the washing fluid.

9. A filter system as recited in claim 8, wherein:
   (a) said monitoring means further includes a pressure sensor disposed below a top surface of said filter bed and above a bottom surface of said underdrain, said pressure sensor being vertically spaced from said pressure gauge.

10. A filter system as recited in claim 9, wherein:
    (a) said monitoring means further includes a controller operably associated with said pressure gauge and said pressure sensor for receiving and evaluating pressure readings from said pressure gauge and said pressure sensor to determine if said underdrain is performing acceptably.

11. A filter system as recited in claim 10, wherein:
    (a) said monitoring means includes at least one of a visual alarm and an audible alarm for indicating to an operator that said underdrain is obstructed.

12. A filter system for filtering a liquid, comprising:
    (a) a filter bed having at least one layer of filter media for removing impurities from a liquid passing through said filter bed;
    (b) an underdrain operably associated with said filter bed for directing a fluid through said filter bed; and,
    (c) a pressure gauge for measuring pressure of the fluid, said pressure gauge being disposed upstream of a top surface of said underdrain relative to a direction of flow of a washing fluid.

13. A filter system for filtering a liquid, comprising:
    (a) a filter bed having at least one layer of filter media for retaining impurities in a liquid to be filtered;
    (b) an underdrain operably associated with said filter bed for directing a fluid through said filter bed; and,
    (c) a monitoring unit for monitoring differential pressure across two vertically spaced points of said underdrain to determine whether said underdrain is performing acceptably.

14. A filter system as recited in claim 12, further including:
    (a) a pressure sensor disposed below a top surface of said filter bed and above a bottom surface of said underdrain, said pressure sensor being vertically spaced from said pressure gauge.

15. A filter system as recited in claim 14, wherein:
    (a) a controller operably associated with said pressure gauge and said pressure sensor for receiving and evaluating pressure readings from said pressure gauge and said pressure sensor to determine if said underdrain is performing acceptably.

16. A filter system as recited in claim 15, further including:
    (a) at least one of a visual alarm and an audible alarm for indicating to an operator that said underdrain is obstructed.

17. A filter system as set forth in claim 13, wherein:
    (a) said monitoring unit is configured to obtain at least one pressure reading relating to flow of fluid through said underdrain, said monitoring unit is further configured to determine flow rate of a fluid when said at least one pressure reading is obtained.

18. A filter system as set forth in claim 17, wherein:
    (a) said monitoring unit is configured to determine whether said underdrain is performing at a predetermined acceptable level based at least in part on at least one pressure reading obtained.

19. A filter system as set forth in claim 17, wherein:
    (a) said monitoring unit is configured to determine whether said underdrain is performing at a predetermined acceptable level based at least in part on at least one pressure reading obtained and the flow rate determined.

20. A filter system as recited in claim 19, further including:
    (a) at least one of a visual alarm and an audible alarm for indicating to an operator that said underdrain is obstructed.

* * * * *